Patented July 10, 1934

1,965,959

UNITED STATES PATENT OFFICE 1,965,959

PRODUCTION OF STOVING LACQUERS

Hans Klein and Martin Luther, Mannheim, Germany, assignors to I. G. Farbenindustrie Aktiengesellschaft, Frankfort - on - the - Main, Germany, a corporation of Germany No Drawing. Application July 25, 1929, Serial No. 381,066. In Germany August 13, 1928

9 Claims. (Cl. 134—26)

The present invention relates to the production of stoving lacquers.

We have found that highly valuable stoving lacquers can be obtained by dispersing oxidation products of organic high molecular compounds, such as paraffin hydrocarbons, waxes and the like, or fractions of such oxidation products, in organic solvents and/or diluents, if desired in conjunction with other lacquer forming bodies. For example the products obtainable as residues on distilling the said oxidation products, or fractions thereof, of solid organic high molecular compounds are particularly suitable, especially when the oxidation has been carried out very intensely. Coatings on metal, glass and the like consisting of or comprising these residues yield, when stoved to from 100° to 300° centigrade, resistant high polish lacquer coatings of shades ranging from yellow to deep black. Moreover, oxidation products which contain a considerable amount of lacquer-forming constituents, such as hydroxy carboxylic acids or their condensation products such as lactones, and other high molecular substances insoluble in petroleum ether, may also be advantageously employed without previous distillation, or the distillation may be stopped after a short time so that only low molecular and rather easily volatile constituents are removed. When they are heated, these oxidation products quickly give up constituents which do not form lacquers, such as fatty acids and paraffin hydrocarbons and the like which have not been oxidized. The products obtainable by extraction, for example by means of petroleum ether or benzine, of the acid fraction isolated from the crude oxidation products can also be employed.

Suitable oxidation products can be obtained for example by treating paraffin wax in a cylindric vessel provided wtih filler bodies with a strong current of air for from 6 to 10 hours and at about 150° C.

It is frequently preferable to subject the substances obtained by the oxidation of paraffin hydrocarbons and the like, before their application, to a heat treatment, if desired with the addition of a volatile polymerizing agent such as sulphur, oxygen, air, oxides of nitrogen, chlorine and the like. In this manner the constituents of a lower molecular weight are converted into products of a high molecular weight, and masses thus obtained are very well suited for the production of lacquers.

The said products can be employed for lacquering either alone or in admixture with other resinifiable organic substances usually employed in the production of stoving lacquers such as asphalts, linseed oil, pitch from mineral or brown coal tar, stearin pitch, blue oil, (linseed oil boiled in the presence of a little Paris blue) and the like. Their solutions, for example in benzene, can be advantageously employed as spraying and dipping lacquers.

The following examples will further illustrate the nature of this invention, but the invention is not restricted to these examples. The parts are by weight.

Example 1

145 parts of a viscous brownish black product obtained as a residue in the distillation of 500 parts of the carboxylic acids, insoluble in petroleum ether and obtained by pressing from the crude oxidation product of paraffin wax, are treated with chlorine at 200° centigrade while stirring, until an increase in weight of 2.5 parts has occurred. The product is then black and forms a tenacious mass after cooling. A solution of the same in 600 parts of toluene constitutes an excellent enamel lacquer. The coatings leave behind, after heating to 170° centigrade, deep black lacquer films on metal, glass and the like, which are very adherent, highly elastic and extremely resistant to attack by chemicals.

Example 2

The distillation residue employed in Example 1 can also be employed dissolved in toluene, benzene, tetrahydronaphthalene and the like without previously having been subjected to a treatment with chlorine. The coatings prepared with these solutions yield, when heated to from 190° to 200° centigrade, lacquer films having greater hardness but somewhat smaller elasticity than those obtained by employing coatings prepared from the products treated with chlorine.

Example 3

Soft paraffin wax is oxidized and the portion insoluble in a benzine with a boiling range from 70° to 80° C., of the oxidation product is distilled at a temperature up to 360° C. 150 parts of the distillation residue are carefully heated in an enamelled vessel in a metal bath heated to 300° C. while stirring and incorporating 5 parts of sulphur in the course of half an hour. As soon as the evolution of hydrogen sulphide has decreased the mass is allowed to cool and is then dissolved in five times its quantity of tetrahydronaphthalene. Coatings prepared with the aid of this solution possess after stoving a warm brownish black colour, a high gloss and a high stability on bending.

Example 4

Hard paraffin wax is oxidized and the oxidation product is distilled up to 360° C. and at a pressure of from 30 to 40 millimeters mercury gauge. The residue is then treated with a weak current of air for 3 hours and at 220° C. The product is then dissolved in tetrahydronaphthalene and applied, the coatings obtained after heating in a stove constituting covering pure dark lacquer films.

Example 5

40 parts of the black product obtainable as described in Example 1 are intimately mixed with 10 parts of gilsonite and 10 parts of stearin pitch while stirring, heating and incorporating 3 parts of lamp black and 10 parts of blue oil. The mass obtained is then dissolved and applied as a lacquer which furnishes, after stoving, deep black shades of a slightly mat gloss.

We claim:

1. As new articles of manufacture stoving lacquers comprising a from viscous to solid oxidation product of paraffin wax, and an organic solvent.

2. As new articles of manufacture stoving lacquers comprising the difficultly volatile fraction of a from viscous to solid oxidation product of paraffin wax, and an organic solvent.

3. As new articles of manufacture stoving lacquers comprising the portion difficultly volatile and insoluble in petroleum ether of a from viscous to solid oxidation product of paraffin wax, and an organic solvent.

4. As new articles of manufacture stoving lacquers comprising a polymerized from viscous to solid oxidation product of paraffin wax and, an organic solvent.

5. As new articles of manufacture stoving lacquers comprising a chlorinated from viscous to solid oxidation product of paraffin wax, and an organic solvent.

6. As new articles of manufacture stoving lacquers comprising a chlorinated difficulty volatile fraction of a from viscous to solid oxidation product of paraffin wax, and an organic solvent.

7. As new articles of manufacture stoving lacquers comprising a chlorinated portion difficultly volatile and insoluble in petroleum ether, of a from viscous to solid oxidation product of paraffin wax, and a liquid hydrocarbon.

8. As new articles of manufacture stoving lacquers comprising a from viscous to solid oxidation product of paraffin wax, a resinifiable organic substance, and an organic solvent.

9. The process for the production of stoving lacquers which comprises dispersing a from viscous to solid oxidation product of paraffin wax in an organic solvent.

HANS KLEIN.
MARTIN LUTHER.